US008837358B2

(12) United States Patent
Lunttila et al.

(10) Patent No.: US 8,837,358 B2
(45) Date of Patent: Sep. 16, 2014

(54) UL ACK/NACK FOR INTER-RADIO ACCESS TECHNOLOGY CARRIER AGGREGATION

(75) Inventors: Timo Erkki Lunttila, Espoo (FI); Esa Tapani Tiirola, Kempele (FI); Juho Pirskanen, Tampere (FI)

(73) Assignee: Nokia Siemens Networks Oy, Espoo (FI)

( * ) Notice: Subject to any disclaimer, the term of this patent is extended or adjusted under 35 U.S.C. 154(b) by 341 days.

(21) Appl. No.: 12/906,520

(22) Filed: Oct. 18, 2010

(65) Prior Publication Data

US 2012/0093073 A1 Apr. 19, 2012

(51) Int. Cl.
| | |
|---|---|
| *H04L 1/16* | (2006.01) |
| *H04L 5/00* | (2006.01) |
| *H04L 1/18* | (2006.01) |
| *H04L 27/00* | (2006.01) |
| *H04W 72/04* | (2009.01) |
| *H04L 1/00* | (2006.01) |
| *H04W 72/00* | (2009.01) |
| *H04W 28/04* | (2009.01) |
| *H04W 88/06* | (2009.01) |

(52) U.S. Cl.
CPC ............ *H04L 1/1607* (2013.01); *H04L 5/0092* (2013.01); *H04L 1/1854* (2013.01); *H04L 2001/0096* (2013.01); *H04L 5/001* (2013.01); *H04W 72/00* (2013.01); *H04L 5/0055* (2013.01); *H04W 28/04* (2013.01); *H04L 5/0023* (2013.01); *H04L 27/0008* (2013.01); *H04W 88/06* (2013.01); *H04L 5/0057* (2013.01); *H04W 72/0413* (2013.01)
USPC ......................................................... 370/328

(58) Field of Classification Search
CPC .............. H04L 5/0053; H04L 1/1822; H04W 72/1284; H04W 74/02

USPC .................................................... 370/328–329
See application file for complete search history.

(56) References Cited

U.S. PATENT DOCUMENTS

2008/0040179 A1     2/2008  Masermann et al. ............. 705/8
2008/0075184 A1*    3/2008  Muharemovic et al. ...... 375/260
(Continued)

FOREIGN PATENT DOCUMENTS

EP          1798898 A1     6/2007
EP          2 073 397 A1   6/2009
(Continued)

OTHER PUBLICATIONS

Nokia, UL ACK/NACK Feedback for Power-Limited UE in LTE-A TDD, 3GPP TSG RAN WG1 Meeting #61, R1-102939, Montreal, Canada, May 10-14, 2010, pp. 1-4.*

(Continued)

*Primary Examiner* — Benjamin Lamont
(74) *Attorney, Agent, or Firm* — Harrington & Smith

(57) ABSTRACT

A method is disclosed that includes, for each of a multiplicity of subframes to be communicated using a first radio access technology, determining a first number of bits used for first feedback information corresponding to a first communication effected using the first radio access technology and a second number of bits used for second feedback information corresponding to a second communication effected using a second radio access technology. The method further includes, using only the first radio access technology, communicating the multiplicity of subframes, wherein for each of the multiplicity of subframes, included in the subframe are the first feedback information using the determined first number of bits and the second feedback information using the determined second number of bits. Apparatus, program products, and computer programs are also disclosed.

19 Claims, 9 Drawing Sheets

| CARRIER | PCELL | SCELL 1 | SCELL 2 | SCELL 3 | TOTAL # OF AN BITS (ODD/EVEN SUBFRAMES) |
|---|---|---|---|---|---|
| TX MODE | LTE MIMO | HSPA MIMO | | | 2+(0 OR 2)=2 OR 4 |
| | LTE MIMO | LTE MIMO | LTE SIMO | HSPA MIMO | 2+2+1+(0 OR 2)=5 OR 7 |
| | LTE MIMO | LTE SIMO | HSPA SIMO | | 2+1+(0 OR 1)=3 OR 4 |

(56) References Cited

U.S. PATENT DOCUMENTS

| | | | | |
|---|---|---|---|---|
| 2009/0300456 | A1* | 12/2009 | Pelletier et al. | 714/749 |
| 2010/0312994 | A1* | 12/2010 | McBeath et al. | 712/220 |
| 2010/0322173 | A1* | 12/2010 | Marinier et al. | 370/329 |
| 2011/0081936 | A1* | 4/2011 | Haim et al. | 455/522 |
| 2011/0134831 | A1 | 6/2011 | Pirskanen | 370/328 |
| 2011/0194500 | A1* | 8/2011 | Kim et al. | 370/328 |
| 2011/0243066 | A1* | 10/2011 | Nazar et al. | 370/328 |
| 2011/0268048 | A1 | 11/2011 | Toskala et al. | 370/329 |
| 2012/0230268 | A1* | 9/2012 | Marinier et al. | 370/329 |

FOREIGN PATENT DOCUMENTS

| | | | | |
|---|---|---|---|---|
| KR | 10-2009-0047106 | * | 5/2009 | H04W 4/20 |
| WO | WO-2009/093891 A1 | | 7/2009 | |
| WO | WO 2010/044564 | * | 4/2010 | H04L 1/18 |
| WO | WO 2011/088612 A1 | | 7/2011 | |

OTHER PUBLICATIONS

Panasonic, Support for UL ACK/NACK Bundling Across CCs for Carrier Aggregation, R1-103752, 3GPP TSG RAN WG1 Meeting #61bis, Dresden, Germany, Jun. 28-Jul. 2, 2010, pp. 1-2.*

Nokia, On the Need for Cross-Carrier A/N Bundling, R1-103790, 3GPP TSG RAN WG1 Meeting #61bis, Dresden, Germany, Jun. 28-Jul. 2, 2010, pp. 1-4.*

NTT DoCoMo, Uplink ACK/NACK Resource Assignments for Carrier Aggregation, R1-104016, 3GPP TSG RAN WG1 Meeting #61bis, Dresden, Germany, Jun. 28-Jul. 2, 2010, pp. 1-3.*

3GPP TS 36.211, V.8.4.0, "3rd Generation Partnership Project; Technical Specification Group Radio Access Network; Evolved Universal Terrestrial Radio Access (E-UTRA); Physical Channels and Modulation (Release 8)", Sep. 2008, 78 pages.

3GPP TS 25.319 V9.7.0, "3rd Generation Partnership Project; Technical Specification Group Radio Access Network; Enhanced uplink; Overall description; Stage 2 (Release 9)", Dec. 2011, 74 pages.

3GPP TR 36.912 V10.0.0, "3rd Generation Partnership Project; Technical Specification Group Radio Access Network; Feasibility study for Further Advancements for E-UTRA (LTE-Advanced) (Release 10)", Mar. 2011, 62 pages.

3GPP TR 36.814 V.1.5.0, "3rd Generation Partnership Project, Technical Specification Group Radio Access Network, Further Advancements for E-UTRA Physical Layer Aspects (Release 9)", Nov. 2009, 53 pages.

3GPP TS 25.308 V9.6.1, "3rd Generation Partnership Project; Technical Specification Group Radio Access Network; High Speed Downlink Packet Access (HSDPA); Overall description; Stage 2 (Release 9)", Dec. 2011, 66 pages.

3GPP TS 25.211 V9.2.0, "3rd Generation Partnership Project; Technical Specification Group Radio Access Network; Physical channels and mapping of transport channels onto physical channels (FDD) (Release 9)", Sep. 2010, 58 pages.

"Resource Allocation Considerations for Multi-Carrier LTE-Advanced Systems Operating in Backward Compatible Mode", Y. Wang, K. I. Pedersen, P.E. Mogensen, and T. B. Sorensen, in Proc. IEEE PIMRC, Sep. 2009, 5 pgs.

"Architecture Providing Multi-System Carrier Aggregation", U.S. Appl. No. 12/630,257, filed Dec. 3, 2009, 48 pgs.

"Feedback for Inter-Radio Access Technology Carrier Aggregation", U.S. Appl. No. 12/774,132, filed May 5, 2010, 50 pgs.

"Draft Report of 3GPP TSG RAN WG1 #62 v0.1.0", 3GPP TSG RAN WG1 Meeting #62bis, MCC Support, Oct. 15, 2010, pp. 22-24.

"On ACK/NACK codebook performance for carrier aggregation", Ericsson, ST-Ericsson, 3GPP TSG-RAN WG1 #62, R1-104840, Aug. 2010, 10 pgs.

"$3^{rd}$ Generation Partnership Project; Technical Specification Group Radio Access Network; Physical channels and mapping of transport channels onto physical channels (FDD) (Release 9)", 3GPP TS 25.211 V9.1.0, Dec. 2009, 58 pgs.

"$3^{rd}$ Generation Partnership Project; Technical Specification Group Radio Access Network; High Speed Downlink Packet Access (HSDPA); Overall description; Stage 2 (Release 8)", 3GPP TS 25.308 V8.0.0, Dec. 2007, 50 pgs.

"$3^{rd}$ Generation Partnership Project; Technical Specification Group Radio Access Network; High Speed Downlink Packet Access (HSDPA); Overall description; Stage 2 (Release 9)", 3GPP TS 25.308 V9.0.0, Jun. 2009, 65 pgs.

"$3^{rd}$ Generation Partnership Project; Technical Specification Group Radio Access Network; Enhanced uplink; Overall description; Stage 2 (Release 9)", 3GPP TS 25.319 V9.0.0, Jun. 2009, 70 pgs.

"$3^{rd}$ General Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)", 3GPP TS 36.300 V8.10.0, Jun. 2007, 106 pgs.

"$3^{rd}$ General Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 9)", 3GPP TS 36.300 V9.1.0, Sep. 2009, 165 pgs.

"$3^{rd}$ Generation Partnership Project; Technical Specification Group Radio Access Network; Further Advancements for E-UTRA Physical Layer Aspects (Release 9)", 3GPP TR 36.814 V1.2.1, Jun. 2009, 45 pgs.

"$3^{rd}$ Generation Partnership Project; Technical Specification Group Radio Access Network; Requirements for further advancements for Evolved Universal Radio Access (E-UTRA) (LTE-Advanced) (Release 8)", 3GPP TR 36.913 V8.0.1, Mar. 2009, 15 pgs.

Qualcomm Europe; "HS-DPCCH design for DC-HSDPA and MIMO"; R1-091599; 3GPP TSG-RAN WG1 #56bis; Mar. 23-27, 2009; Seoul, South Korea; whole document (21 pages).

* cited by examiner

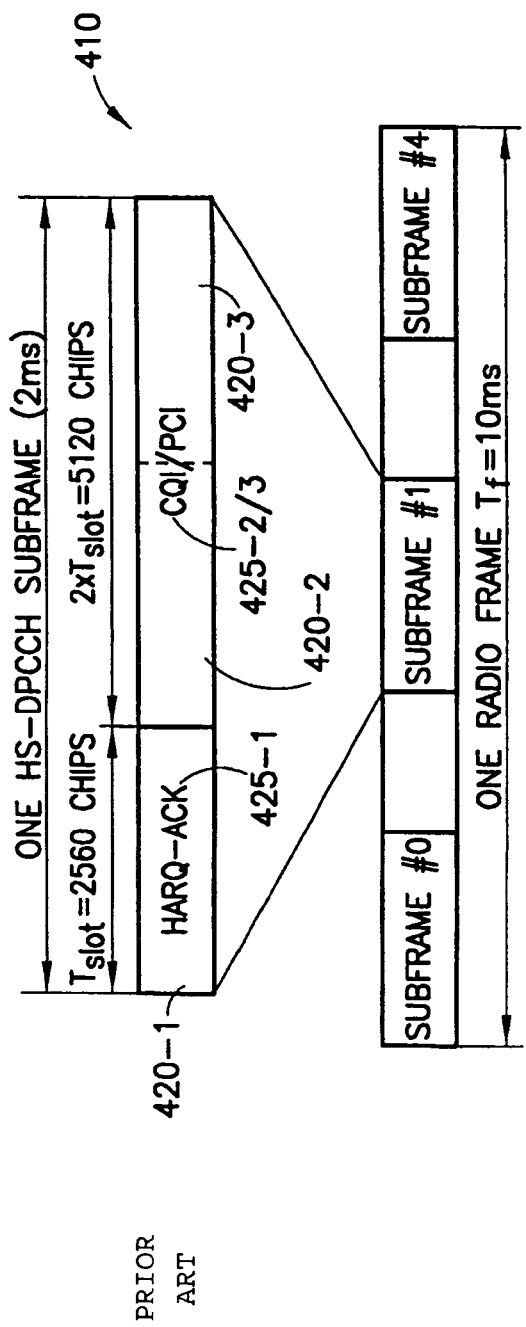
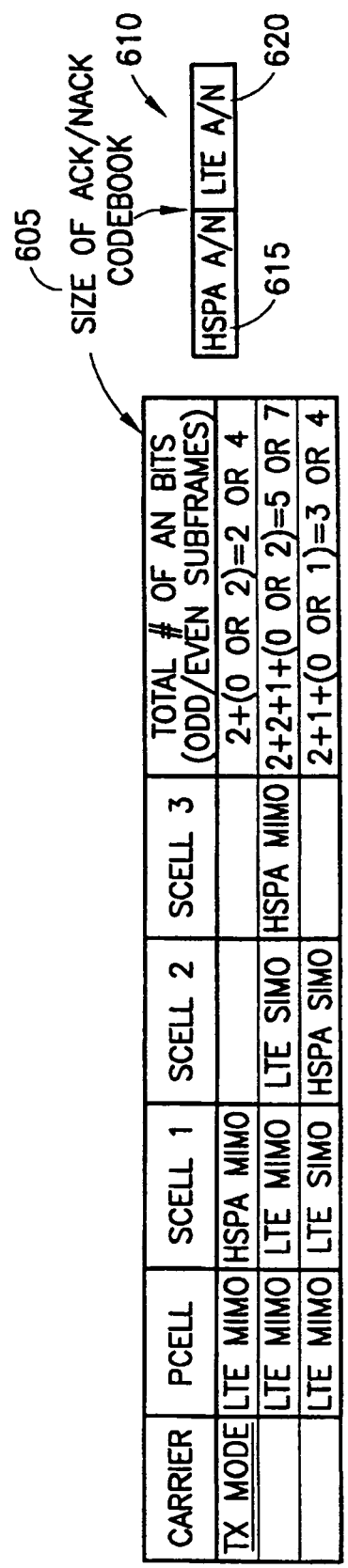
FIG. 5 PRIOR ART
FIG. 6

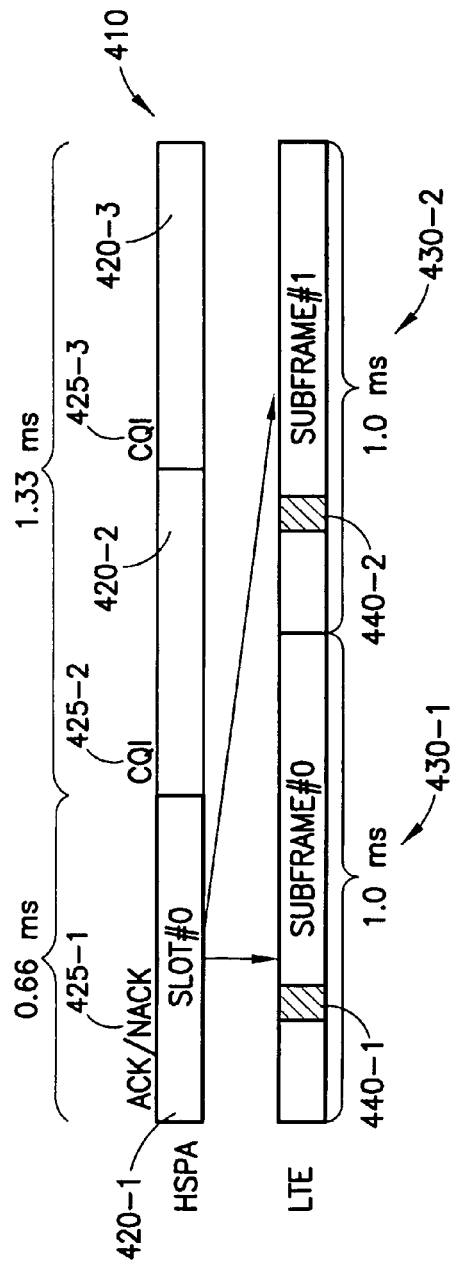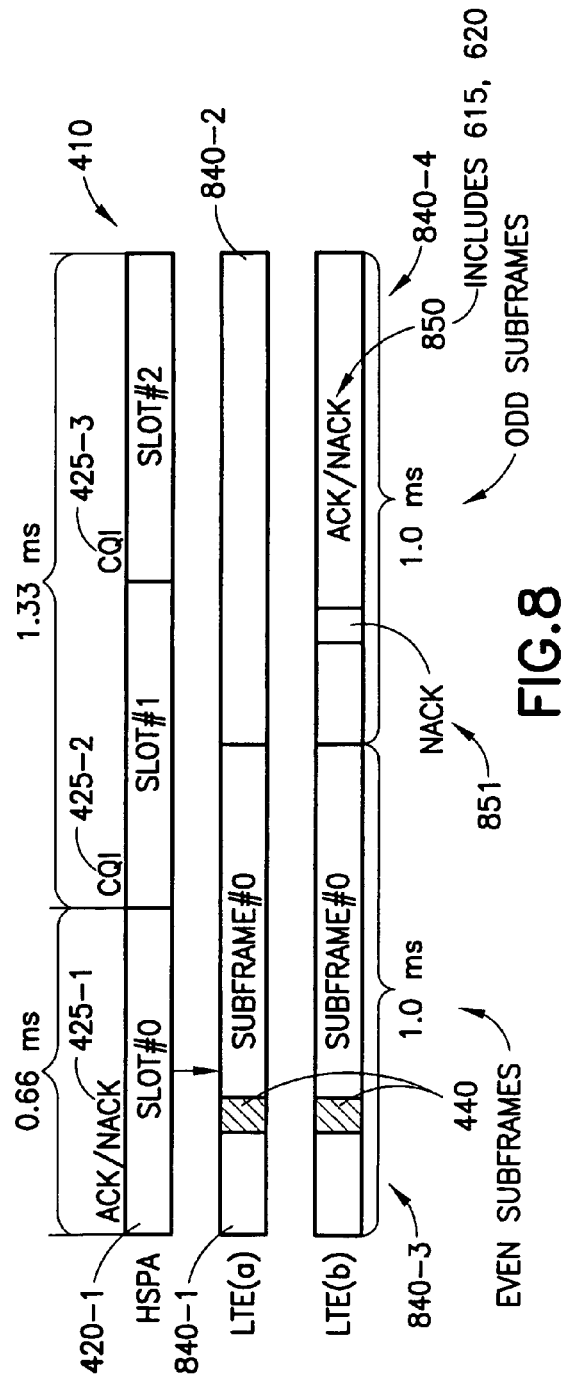

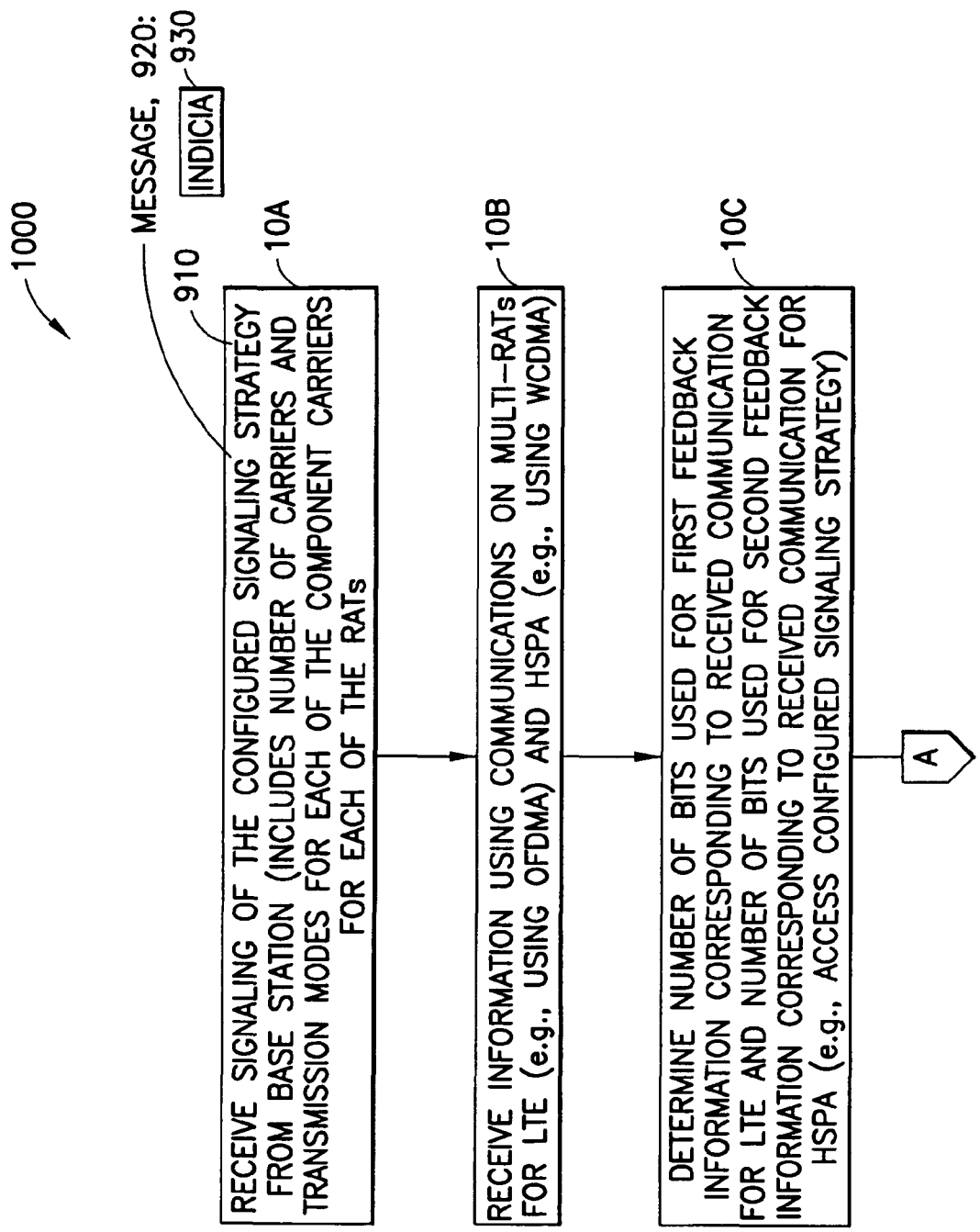

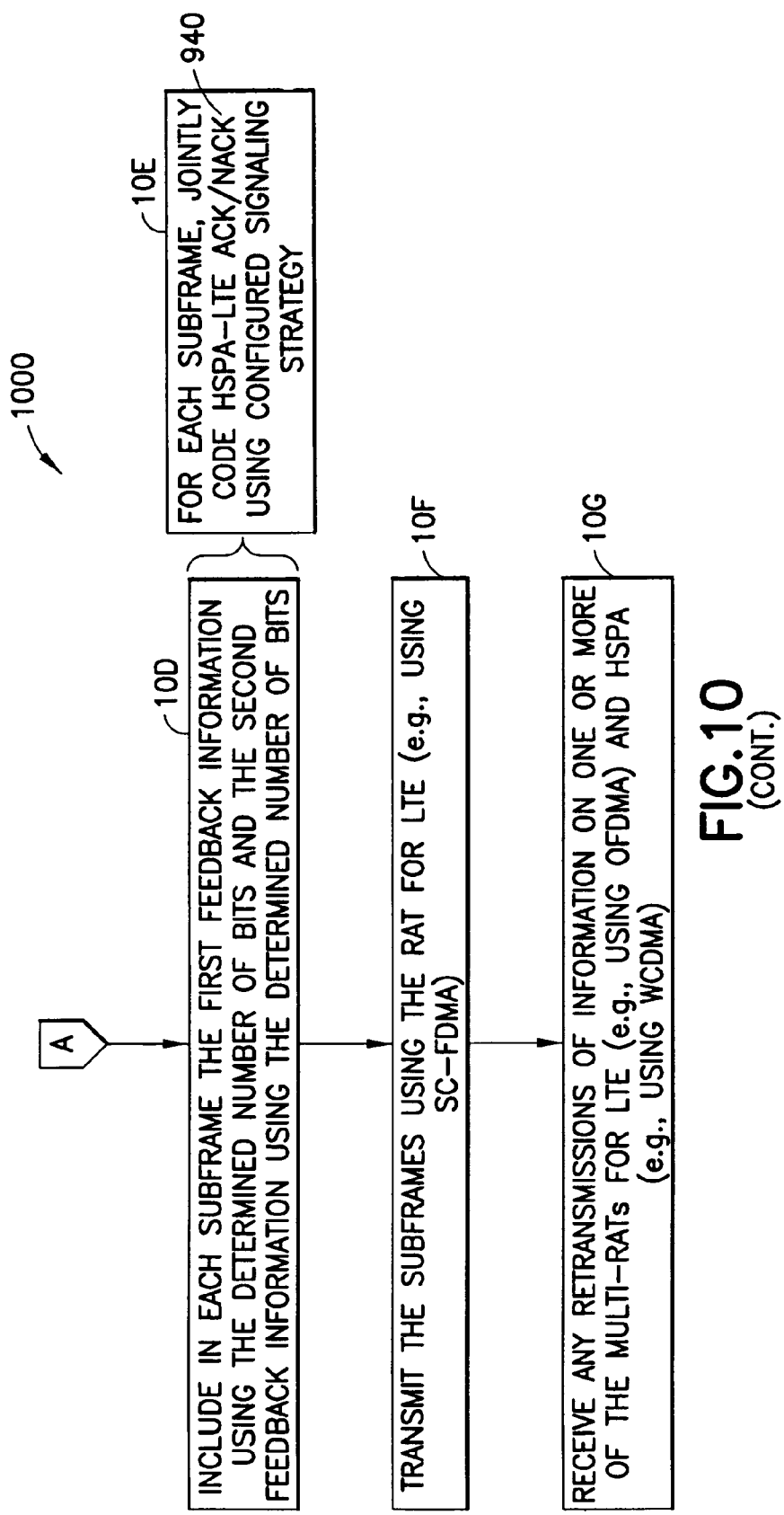

UL ACK/NACK FOR INTER-RADIO ACCESS TECHNOLOGY CARRIER AGGREGATION

TECHNICAL FIELD

This invention relates generally to radio frequency (RF) reception and transmission and, more specifically, relates to radio access technology carrier aggregation.

BACKGROUND

This section is intended to provide a background or context to the invention that is recited in the claims. The description herein may include concepts that could be pursued, but are not necessarily ones that have been previously conceived, implemented or described. Therefore, unless otherwise indicated herein, what is described in this section is not prior art to the description and claims in this application and is not admitted to be prior art by inclusion in this section.

The following abbreviations that may be found in the specification and/or the drawing figures are defined as follows:

3GPP third generation partnership project
ACK acknowledge (positive acknowledge)
ARI ACK/NACK resource indicator
BTS base transceiver system
BW bandwidth
CA carrier aggregation
CC component carrier
C-Plane control plane
CN core network
CQI channel quality indicator
DC dual carrier
DL downlink (eNB, Node B towards UE)
DTX discontinuous transmission
eNB EUTRAN Node B (evolved Node B)
EPC evolved packet core
EUTRAN evolved UTRAN (LTE)
GGSN gateway general packet radio system support node
GSM global system for mobile communication
HARQ hybrid automatic repeat request
HS-DSCH high speed downlink shared channel
HS-SCCH high speed shared control channel
HSPA high speed packet access
HSDPA high speed downlink packet access
HSUPA high speed uplink packet access
I-HSPA internet HSPA (evolved HSPA)
IP internet protocol
LTE long term evolution
MAC medium access control
MIMO multiple input, multiple output
MM/MME mobility management/mobility management entity
NACK not acknowledge/negative acknowledge
NBAP Node B application part (signaling)
Node B base station (includes BTS)
OFDMA orthogonal frequency division multiple access
O&M operations and maintenance
Pcell primary cell
PDCP packet data convergence protocol
PDU protocol data unit
Phy physical
PMI pre-coding matrix index
PRB physical resource block
PDCCH physical downlink control channel
PDSCH physical downlink shared channel
PUCCH physical uplink control channel
PUSCH physical uplink shared channel
RACH random access channel
RAN radio access network
RAT radio access technology
RB radio bearer
RE resource element
RF radio frequency
RLC radio link control
RNC radio network controller
ROHC robust (internet) header compression
RRC radio resource control
SAW stop-and-wait
Scell secondary cell
SC-FDMA single carrier, frequency division multiple access
SGSN serving gateway support node
SGW serving gateway
SIMO single input, multiple output
SINR signal to interference plus noise ratio
SR scheduling request
TCP transmission control protocol
TFRC TCP-friendly rate control
TTI transmit time interval
U-Plane user plane
UE user equipment
UL uplink (UE towards eNB, Node B)
UTRAN universal terrestrial radio access network
WCDMA wideband code division multiple access The specification of a communication system known as evolved UTRAN (EUTRAN, also referred to as UTRAN-LTE or as EUTRA) has been specified by 3GPP in Rel-8 (release eight). As specified the DL access technique is OFDMA, and the UL access technique is SC-FDMA.

One specification of interest is 3GPP TS 36.300, V8.10.0 (2009-9), 3rd Generation Partnership Project; Technical Specification Group Radio Access Network; Evolved Universal Terrestrial Radio Access (EUTRA) and Evolved Universal Terrestrial Access Network (EUTRAN); Overall description; Stage 2 (Release 8). This system may be referred to for convenience as LTE Rel-8 (which also contains 3G HSPA and its improvements). In general, the set of specifications given generally as 3GPP TS 36.xyz (e.g., 36.211, 36.311, 36.312, etc.) may be seen as describing the Release 8 LTE system. More recently, Release 9 and Release 10 versions of at least some of these specifications have been published including 3GPP TS 36.300, V9.1.0 (2009-9).

FIG. 1 reproduces FIG. 4-1 of 3GPP TS 36.300, and shows the overall architecture of the E-UTRAN system. The E-UTRAN system includes eNBs, providing the EUTRA user plane (PDCP/RLC/MAC/PHY) and control plane (RRC) protocol terminations towards the UE. The eNBs are interconnected with each other by means of an X2 interface. The eNBs are also connected by means of an S1 interface to an EPC, more specifically to a MME (Mobility Management Entity) by means of a S1 MME interface and to a Serving Gateway (SGW) by means of a S1 interface. The S1 interface supports a many to many relationship between MMEs/Serving Gateways and eNBs.

Reference can be made to 3GPP TR 36.814, V1.2.1 (2009-06), 3rd Generation Partnership Project; Technical Specification Group Radio Access Network; Further Advancements for E-UTRA Physical Layer Aspects (Release 9). Reference can also be made to 3GPP TR 36.913, V8.0.1 (2009-03), 3rd Generation Partnership Project; Technical Specification Group Radio Access Network; Requirements for Further Advancements for E-UTRA (LTE-Advanced) (Release 8). A goal of LTE-A is to provide significantly enhanced services by means of higher data rates and lower latency with reduced cost.

GSM, WCDMA, and LTE in their first releases utilized single carrier transmission. Since then, multicarrier operation has been introduced in GERAN EGDE and WCDMA HSDPA (TS25.308 Rel-8, Rel-9) and HSUPA in (TS25.319 Rel9) operation. In HSPA multicarrier operation, the UE and Node B transmit on two parallel carriers in quite an independent manner and the multicarrier operation can be seen as multiple parallel single carrier transmissions performed on different carrier frequencies to/from the single UE. The multicarrier operation in HSDPA (dual cell or dual band) supports only single carrier uplink operation, but the dual carrier HSUPA requires dual carrier uplink operation.

As is specified in 3GPP TR 36.913, LTE-A should operate in spectrum allocations of different sizes, including wider spectrum allocations than those of Rel-8 LTE, e.g., up to 100 MHz, to achieve the peak data rate of 100 mega-bits per second (Mbit/s) for high mobility and 1 Gbit/s for low mobility. LTE-A (to be included into 3GPP Release-10) is going to include carrier aggregation (CA), providing the capability to aggregate together up to five LTE carriers referred to as Component Carriers (CCs). Rel-8 terminals receive/transmit on one component carrier, whereas LTE-Advanced terminals may receive/transmit on multiple component carriers simultaneously to achieve higher (e.g., wider) bandwidths.

While there are benefits to these scenarios, there are additional improvements that could be made.

BRIEF DESCRIPTION OF THE DRAWINGS

The foregoing and other aspects of embodiments of this invention are made more evident in the following Detailed Description of Exemplary Embodiments, when read in conjunction with the attached Drawing Figures, wherein:

FIG. 2, including FIG. 2A shows a logical split of roles of LTE and HSPA radios in inter-RAT carrier aggregation, wherein LTE UL is utilized to convey feedback information, such as HSPA UL control signaling (e.g., ACK/NACK or CQI or both); and FIG. 2B shows an example of carrier aggregation for RAT where both intra-band (carriers one and two) and inter-band (carrier three combined with carriers one and two) carrier aggregation.

FIG. 3, including

FIG. 5 is an illustration of frame structure for uplink HS-DPCCH (3GPP TS25.211 V. 9.1.0).

FIG. 6 is an exemplary table illustrating sizes of the ACK/NACK codebook in even and odd subframes with a few exemplary CA configurations, based on the first configured signaling strategy.

FIG. 7 is a diagram illustrating that ACK/NACK repetition for HSPA can be realized by mapping the ACK/NACK into two consecutive LTE subframes in a second configured signaling strategy (included in "Option 2").

FIG. 8 is a diagram illustrating ACK/NACK signaling (a) without LTE A/N signaling during subframe number one (#1) and (b) with LTE A/N signaling during subframe number 1 (#1) in a third configured signaling strategy (included in "Option 3").

FIG. 10 is a block diagram of an exemplary flowchart performed by a user equipment for uplink ACK/NACK for inter-radio access technology carrier aggregation.

SUMMARY

Figure 1:
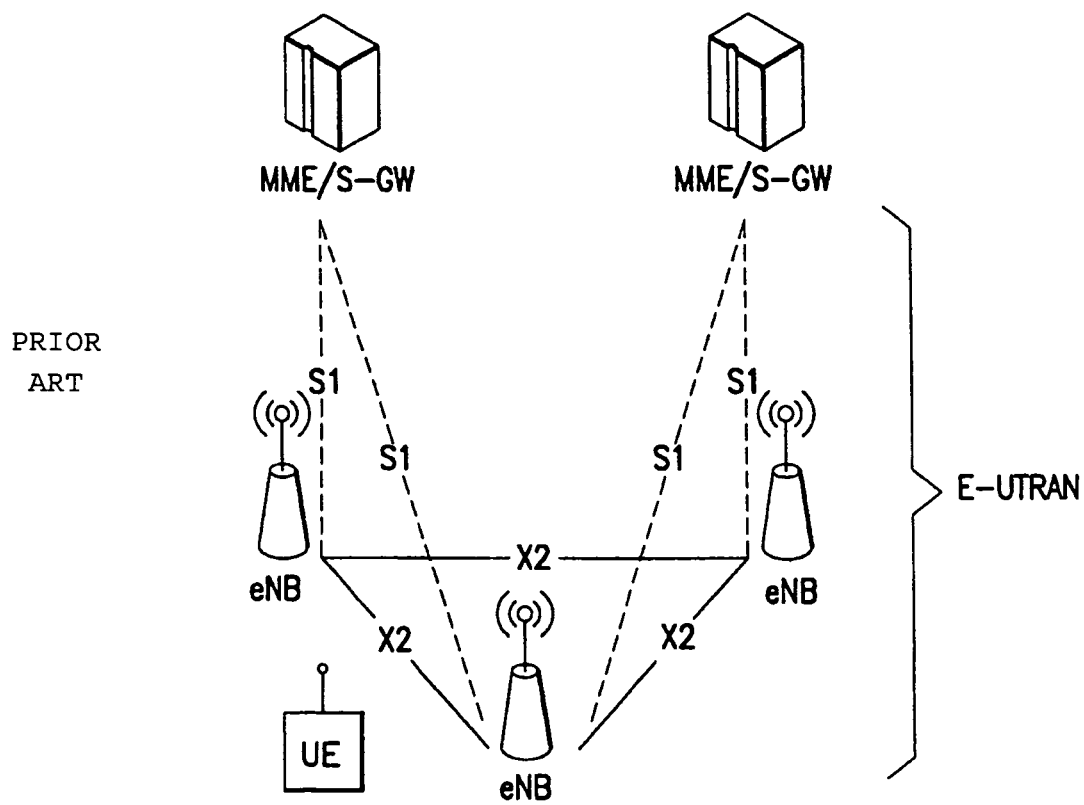
FIG. 1 reproduces FIG. 4-1 of 3GPP TS 36.300, and shows the overall architecture of the EUTRAN system.

In an exemplary embodiment, a method is disclosed that includes, for each of a multiplicity of subframes to be communicated using a first radio access technology, determining a first number of bits used for first feedback information corresponding to a first communication effected using the first radio access technology and a second number of bits used for second feedback information corresponding to a second communication effected using a second radio access technology. The method further includes, using only the first radio access technology, communicating the multiplicity of subframes, wherein for each of the multiplicity of subframes, included in the subframe are the first feedback information using the determined first number of bits and the second feedback information using the determined second number of bits.

In another exemplary embodiment, an apparatus includes one or more transceivers configured to transmit and receive using a first radio access technology and configured to transmit and receive using a second radio access technology, one or more processors, and one or more memories including computer program code. The one or more memories and the computer program code are configured to, with the one or more processors, cause the apparatus to perform at least the following: for each of a multiplicity of subframes to be communicated using a first radio access technology, determining a first number of bits used for first feedback information corresponding to a first communication effected using the first radio access technology and a second number of bits used for second feedback information corresponding to a second communication effected using the second radio access technology; and using only the first radio access technology, communicating the multiplicity of subframes, wherein for each of the multiplicity of subframes, included in the subframe are the first feedback information using the determined first number of bits and the second feedback information using the determined second number of bits.

DETAILED DESCRIPTION OF THE DRAWINGS

As described above, LTE Release-10 (also known as LTE-Advanced) will enable Carrier Aggregation (CA) providing the capability to aggregate together up to five LTE carriers referred to as Component Carriers (CCs).

Basic scenarios for both downlink and uplink will be included into Release-10 (Rel-10). Similar work has also been carried out in the 3GPP in the context of HSDPA. In Release-10, the work on four-carrier HSDPA is currently ongoing, providing support for up to four, five mega-Hertz (MHz) carriers.

In LTE, the carrier aggregation, also called the multicarrier solution, is one of the main features to be defined for Rel-10 (TR36.814 and TR36.912) for LTE-A. In LTE also the basic principles are similar as the component carriers (single Rel-8 carrier) operate independently. Also in this specification, work will concern the operation with single carrier uplink with multiple downlink carriers.

Recently some network service providers have also expressed their interest in allowing for a hybrid solution to enable Inter-RAT (Radio Access Technology) carrier aggregation across multiple radio access technologies. In this context, considerations on whether some of the component carriers could be LTE (or LTE-Advanced in general) carriers while the other ones would be HSPA carriers has been raised. This would be a rather attractive option since the similarities in the physical layer of the two systems make it possible to reuse the same hardware to a large extent.

Figure 2A:
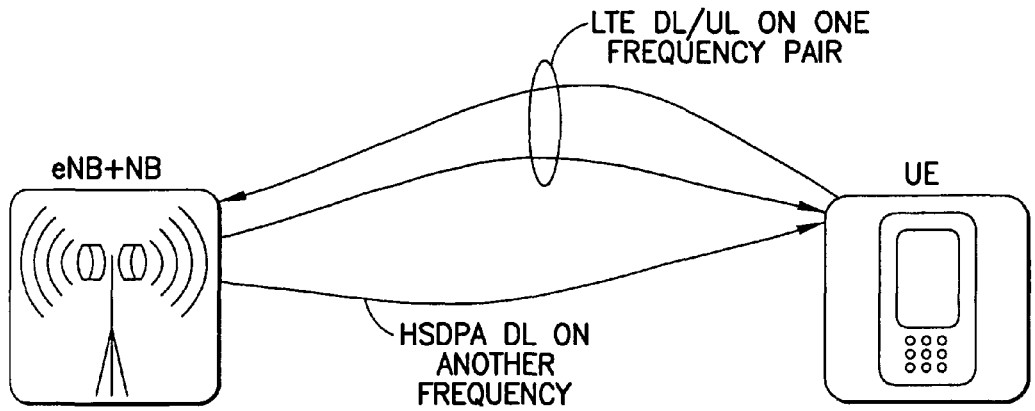
FIG. 2A and FIG. 2B, is a simplistic diagram of inter-RAT carrier aggregation, where.
Figure 2B:
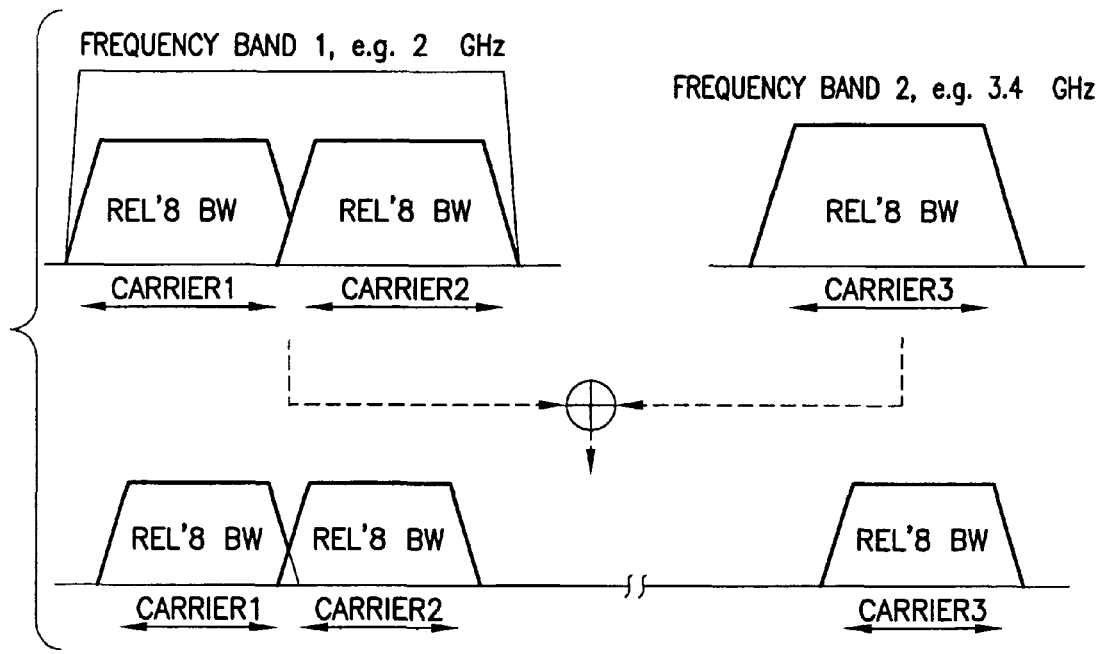

Turning to FIG. 2, including FIG. 2A and FIG. 2B, this figure shows a simplistic diagram of inter-RAT carrier aggregation. FIG. 2A shows a logical split of roles of LTE and HSPA radios in inter-RAT carrier aggregation, and FIG. 2B shows an example of carrier aggregation for RAT, where both intra-band (carriers one and two) and inter-band (carrier three combined with carriers one and two) carrier aggregation are shown. In these examples, the user equipment (UE) receives from co-located eNB (enhanced Node B) and NB (Node B) base stations two downlink communications at the same time, an LTE DL communication (from the eNB) and an HSDPA DL communication (from the NB), where the LTE DL communication includes frequency band two (2) (using OFDMA) and the HSDPA DL communication includes frequency band one (1) (using WCDMA). Inter-RAT carrier aggregation is, e.g., simultaneous communications that occur on at least two different carriers from two different RATs. It is noted that a radio access technology is, e.g., a unique air/radio interface defined by, for instance, a combination of resources (e.g., carriers having certain frequency ranges), resource spaces (e.g., subcarriers and symbols), and modulations. For example, LTE represents one RAT and HSPA represents another RAT. RATs may also define protocol stack layers (e.g., a medium access control layer, a physical layer, etc. It should be noted that the eNB/Node B distinction is only a logical distinction, and a single base station could perform the functions of the eNB/Node B. Although these figures show examples of how an inter-RAT communication might be performed, something to be considered is how feedback for both of LTE and HSDPA should be communicated by the UE back to the eNB.

From the implementation as well as system design point of view, the most straight forward solution might be to limit the usage of HSPA in inter-RAT aggregation to the DL only, and to transmit the necessary HSPA related control signaling over the LTE radio interface. The instant disclosure focuses on the UL signaling principles and procedures required to provide support for sending HSPA UL HARQ feedback control signals (ACK/NACK) over the LTE UL radio interface utilizing signaling mechanisms developed for LTE CA.

U.S. patent Ser. No. 12/630,257 (Juho Pirskanen, "Architecture Providing Multi-System Carrier Aggregation", filed 3 Dec. 2009) outlines a basic system architecture for uplink and downlink LTE and HSDPA Carrier aggregation. HARQ feedback signaling solutions for uplink operation for LTE and HSPA DL only CA have been studied. See for instance, U.S. patent Ser. No. 12/774,132 (A. Toskala et al., "Feedback for Inter-Radio Access Technology Carrier Aggregation", filed 5 May 2010), which concerns these issues.

However, since the filing of these inventions, there has been some further development in the 3GPP in the area of LTE carrier aggregation (i.e., single RAT carrier aggregation). The decision from the RAN WG1 meeting #62 is that in the case of LTE carrier aggregation, the size of the ACK/NACK codebook is dimensioned according to the number of configured component carriers and the transmission modes. This means the number of activated CCs (i.e., active CCs) or the presence of a DL data transmission does not have a direct impact on the ACK/NACK codebook, but, instead, the size of the codebook is determined semi-statically according to higher layer signaling and configuration.

Given the above decision, it becomes apparent the issues related to DTX detection of ACK/NACK might become irrelevant, as the ACK/NACK resources can always be dimensioned according to the number of configured CCs. The instant disclosure provides solutions to make use of this fact with LTE-HSPA carrier aggregation (i.e., multi-RAT carrier aggregation).

Figure 3A:
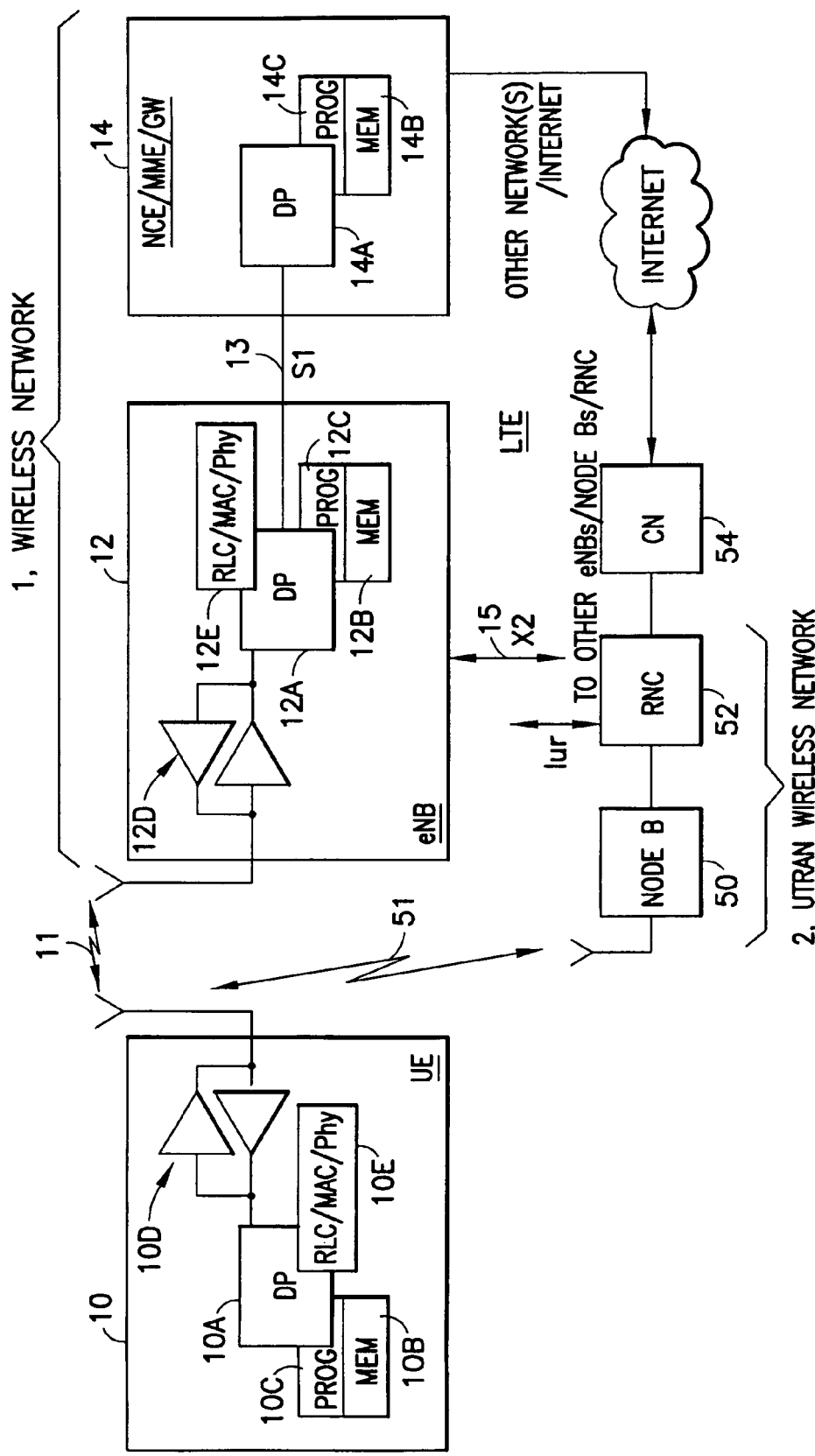
FIGS. 3A and 3B, shows a simplified block diagram of various electronic devices that are suitable for use in practicing the exemplary embodiments of this invention.
Figure 3B:
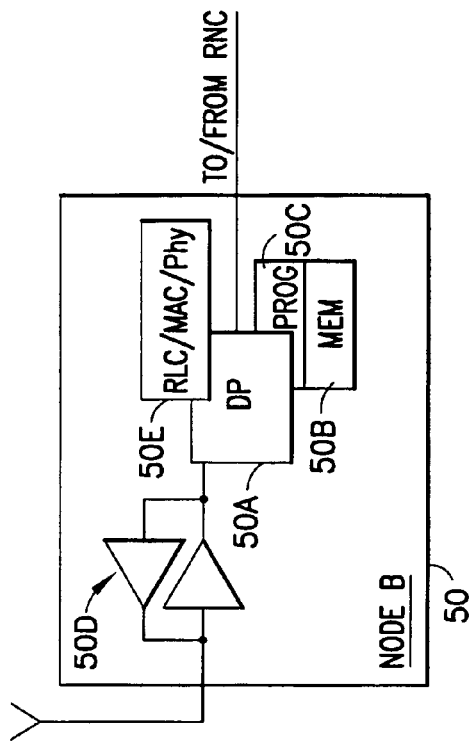

Before describing in further detail the exemplary embodiments of this invention, reference is made to FIG. 3, including FIGS. 3A and 3B, for illustrating a simplified block diagram of various electronic devices and apparatus that are suitable for use in practicing the exemplary embodiments of this invention. In FIG. 3, a wireless network 1 is adapted for communication over a wireless link 11 with an apparatus, such as a mobile communication device which may be referred to as a UE 10, via a network access node, such as an eNB 12 for the case of an LTE or LTE-A network. The network 1 may include a network control element (NCE) 14 that may include the MME/SGW functionality shown in FIG. 1, and which provides connectivity with a further network, such as a telephone network and/or a data communications network (e.g., the internet). The UE 10 includes a controller, such as a computer or a data processor (DP) 10A, a computer-readable memory medium embodied as a memory (MEM) 10B that stores a program of computer instructions (PROG) 10C, and at least one suitable radio frequency (RF) transceiver 10D for bidirectional wireless communications with the eNB 12 via one or more antennas. The eNB 12 also includes a controller, such as a computer or a data processor (DP) 12A, a computer-readable memory medium embodied as a memory (MEM) 12B that stores a program of computer instructions (PROG) 12C, and at least one suitable RF transceiver 12D for communication with the UE 10 via one or more antennas. The eNB 12 is coupled via a data/control path 13 to the NCE 14. The path 13 may be implemented as the S1 interface shown in FIG. 1A. The eNB 12 may also be coupled to another eNB (or Node B) via data/control path 15, which may be implemented as the X2 interface shown in FIG. 1A.

For the purposes of describing the exemplary embodiments of this invention, the UE 10 may be assumed to also include a protocol stack (e.g., at least RLC/MAC/Phy) 10E, and the eNB 12 includes a protocol stack (e.g., at least RLC/MAC/Phy) 12E.

Also shown in FIG. 3 is a second, UTRAN wireless network 2, which is adapted for communication over a wireless link 51 with the UE 10. The wireless network 2 is, e.g., a HSPA wireless network including at least one Node B 50, at least one RNC 52 (together forming the UTRAN) and a CN 54 providing connectivity with a further network, such as a telephone network and/or a data communications network (e.g., the internet). It is assumed that the Node B 50, the RNC 52 and the elements of the CN 54 (e.g., the SGSN and GGSN) will be similarly constructed to also include data processors, memories storing computer programs and other data, and the necessary wireless transceivers and the like for communication with the UE 10.

For instance, in FIG. 3B, it is shown that the Node B 50 also includes a controller, such as a computer or a data processor (DP) 50A, a computer-readable memory medium embodied as a memory (MEM) 50B that stores a program of computer instructions (PROG) 50C, and at least one suitable RF transceiver 50D for communication with the UE 10 via one or more antennas. The Node B 50 may be assumed to also include a protocol stack (e.g., at least RLC/MAC/Phy) 50E.

It is noted that the eNB 12 and the Node B 50 in the example of FIG. 3 are co-located (e.g., at the same physical building or at least both are able to communicate with the UE 10). However, they could additionally be combined into a single base station that performs the functions of the eNB 12 and the Node B 50.

It is assumed for the purposes of this invention that the UE 10 is a multi-mode (dual mode or higher) device capable of operation in different types of wireless networks. For example, there can be a plurality of transceivers 10D, where one or more operate in accordance with LTE OFDMA and SC-FDMA, and where one or more other transceivers operate in accordance with HSPA WCDMA. The program stored in memory 10B is thus assumed to be capable of operation with two or more different types of wireless networks as well, and for establishing and operating the protocol stack 10E in accordance with the particular type of wireless network standard that is in effect at any given time. The techniques herein may be considered as being implemented solely as computer program code in the UE 10, eNode B 12, and Node B 50 (e.g., as PROG 10C, 12C, or 50C, respectively), or as a combination of computer program code (executed by one or more processors) and various hardware, including memory locations, data processors, buffers, interfaces and the like, or entirely in hardware. Additionally, the plurality of transceivers 10D and 12D may also be implemented using any type of wireless communications interface suitable to the local technical environment, for example, they may be implemented using individual transmitters, receivers, transceivers or a combination of such components.

In general, the various embodiments of the UE 10 can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The computer readable MEMs 10B, 12B, and 50B may be of any type suitable to the local technical environment and may be implemented using any suitable data storage technology, such as semiconductor based memory devices, flash memory, magnetic memory devices and systems, optical memory devices and systems, fixed memory and removable memory. The DPs 10A, 12A, and 50A may be of any type suitable to the local technical environment, and may include one or more of general purpose computers, special purpose computers, microprocessors, digital signal processors (DSPs) and processors based on a multi-core processor architecture, as non-limiting examples.

An exemplary embodiment of the instant invention is to utilize ACK/NACK signaling structures developed for the LTE carrier aggregation in LTE Rel-10 for LTE-HSPA carrier aggregation. To be specific, following proposals are made in an exemplary embodiment:

1) An LTE carrier is selected to be PCell (e.g., carrying a Physical Uplink Control Channel, PUCCH) and the RRC connection and security termination are configured in similar fashion as in U.S. patent Ser. No. 12/630,257 (Juho Pirskanen, "Architecture Providing Multi-System Carrier Aggregation", filed 3 Dec. 2009).

2) An HSPA carrier is treated similarly as an LTE SCell from the UE point of view:

a) The HSPA carrier can be configured via higher layer signaling;

b) The same activation and deactivation procedures can be applied as for LTE SCells; and c) Exception: in most situations, no cross carrier scheduling will be allowed.

3) The ACK/NACK codebook is dimensioned according to the number of configured LTE and HSPA carriers and their respective transmission modes (e.g., including whether spatial multiplexing (MIMO) is enabled or disabled). Additionally, the coupling between ACK/NACK and CQI which exists in HSPA is removed, i.e., ACK/NACK is treated separately from CQI as illustrated in FIG. 4 and described below.

Figure 4:
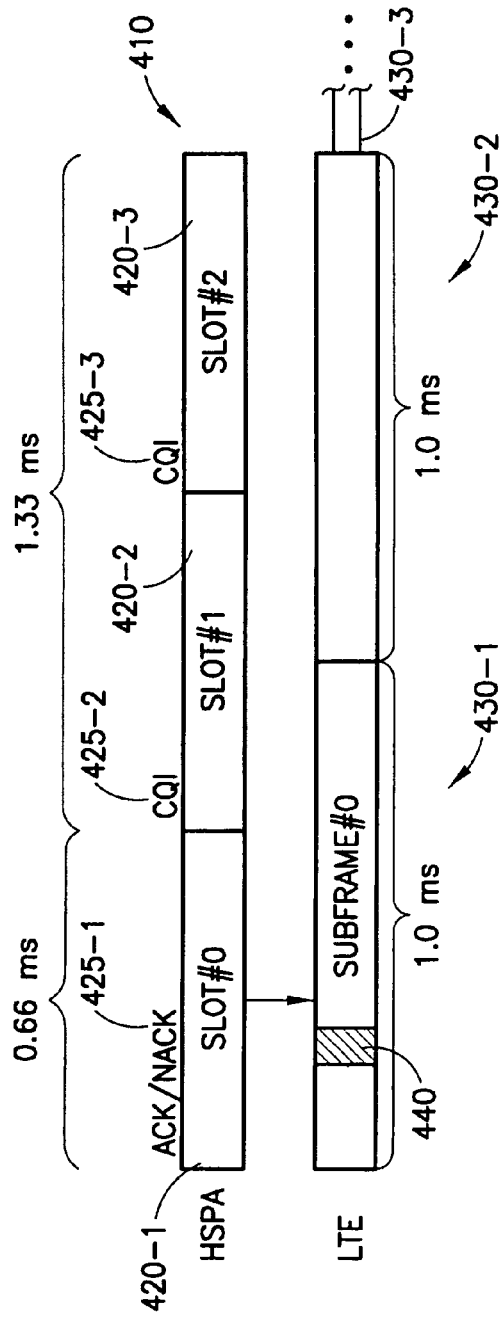
FIG. 4 is a diagram illustrating that coupling between HSPA ACK/NACK and CQI is removed in the LTE UL and HSPA ACK/NACK is mapped into a first configured signaling strategy (included in "Option 1").

Referring to FIG. 4, a subframe 410 of HSPA is shown, and two subframes 430-1 and 430-2 are shown for LTE. Referring also to FIG. 5, this figure shows an illustration of frame structure for uplink HS-DPCCH, as described in 3GPP TS (technical standard) 25.211 V. (version) 9.2.0 (2010-09). The HSDPA uplink feedback in HSPA subframe 410 consists of two basic elements, a HARQ acknowledgement (HARQ-ACK) field 420-1 and a channel quality indication (CQI) field (included in two slots 420-2 and 420-3). The HARQ-ACK field 420-1 includes HARQ ACK/NACK 425-1. The CQI field carries also the precoding control information (PCI) bits 425-2 and 425-3 if the HSDPA link is configured in MIMO mode (e.g., MIMO introduced from Release 7 onwards). For reference, the multiplexing of the HARQ-ACK field 420-1 and CQI/PCI fields 420-2/3 in a HS-DPCCH code channel (using HSPA subframe 410) in the WCDMA/HSPA uplink is depicted in FIG. 5 and is repeated in FIG. 4 for comparison with LTE subframes 430-1 and 430-2.

The HARQ-ACK 425-1 is transmitted in response to reception of a HSPA downlink transmission. The HARQ-ACK transmission timing uniquely identifies the time of the DL transmission being acknowledged. The uplink feedback design should be able to provide a HARQ-ACK feedback for each configured HSDPA data stream (e.g., dual-carrier HSDPA together with MIMO includes a total of four streams) once every two milliseconds.

Regarding the LTE subframes 430-1 and 430-2, the two subframes shown are from a frame that would typically be 10 ms in length and include 10 (ten) 1 (one) ms subframes. The uplink would use SC-FDMA. See, e.g., 3GPP TS 36.211 V8.4.0 (2008-09), Sections 4 and 5. FIG. 4 shows that the HSPA ACK/NACK information is separated from the CQI and is transmitted on the LTE subframe 430-1.

Although not limited thereto, three options for conveying HSPA ACK/NACK are now described.

Option 1 is as follows. When an HSPA carrier has been configured, space 440 (e.g., for communicating ACK/NACK bits) for the HSPA ACK/NACK(s) is reserved only on every second LTE subframe 430 (either even or odd numbered). That is, the size of the ACK/NACK codebook varies deterministically between LTE subframes 430 (see FIG. 4) where HSPA ACK/NACK(s) can or cannot be transmitted. This also means that the duration of the HSPA ACK/NACK transmission is defined to be 1 (one) ms. The space 440 shown in FIG. 4 includes space for the entire ACK/NACK codebook (610, see FIG. 6), and the space 440 shown is merely for ease of exposition and is not to indicate in any way actual location or size of the space.

Turning to FIG. 6 in addition to FIG. 4, FIG. 6 is an exemplary table illustrating sizes 605 of the ACK/NACK codebook 610 in even and odd LTE subframes 430 with a few exemplary CA configurations, based on the first configured signaling strategy. The "Total # of AN bits" indicates the number of bits (e.g., size 605) required for the ACK/NACK codebook 610 that would be communicated in the space 440 and indicates a configured signaling strategy. Additionally, there may be an HSPA A/N (ACK/NACK) portion 615 (number of bits between parentheses in "Total # of AN bits") and an LTE A/N portion 620 (number of bits not between parentheses in "Total # of AN bits") of the ACK/NACK codebook 610.

Assume there is one HSPA DL carrier operating in CA mode with one LTE DL carrier (PCell). Both carriers are in the MIMO mode, i.e., capable of transmitting two transport blocks. Hence the resulting ACK/NACK codebook size 605 is 4 (four) bits in every other LTE subframe 430 and 2 (two) bits in the rest of the LTE subframes 430, including 2 bits in the LTE A/N portion 620 for each subframe 430 and 2 additional bits in the HSPA A/N portion 615 in every other subframe 430 (e.g., in subframes 430-1 and 430-3, but not in subframe 430-2). This is because the HSPA ACK/NACK 420-1 need only be transmitted every other LTE subframe 430.

Two additional examples are given in FIG. 6. In the first additional example, PCell and SCell 1 communicate using LTE MIMO (2 bits per MIMO), SCell 2 communicates using LTE SIMO (single input, multiple output) (1 bit per SIMO), and SCell 3 communicates using HSPA MIMO (2 bits per HSPA MIMO, but only needs to be communicated every 2 ms or every second LTE subframe 430). In the second additional example, PCell communicates using LTE MIMO (2 bits), SCell 1 communicates using LTE SIMO (1 bit), and SCell 3 communicates using HSPA SIMO (1 bit, but only needs to be communicated every 2 ms or every second LTE subframe 430). Thus, FIGS. 4 and 6 illustrate a configured signaling strategy for multiplexing HSPA and LTE ACK/NACK.

Option 2 is as follows. ACK/NACK repetition for HSPA can also be realized easily without any scheduling restrictions by mapping the HSPA ACK/NACK 425-1 into two consecutive LTE subframes 430-1 and 430-2 (e.g., in spaces 440-1 and 440-2 and as part 615 of the ACK/NACK codebook 610 placed in the spaces 440) as shown in FIG. 7. ACK/NACK repetition over multiple 2-ms HSPA TTIs can also be supported with the same principle. In this example, the size 605 of the ACK/NACK codebook 610 is (and the number of bits used for HSPA A/N 615 and LTE A/N 620 are) determined based on the configured LTE and HSPA carriers and their respective transmission modes, and also the ACK/NACK repetition. Thus, FIG. 7 illustrates another configured signaling strategy for multiplexing HSPA and LTE ACK/NACK.

Option 3 is as follows. The ACK/NACK codebook 610 is (and the number of bits used for HSPA A/N 615 and LTE A/N 620 are) dimensioned according to the number of configured LTE and HSPA carriers and their respective transmission modes for both odd LTE subframes (e.g., 840-2 and 840-4; see FIG. 8) and even LTE subframes (e.g., 840-1 and 840-3). In this option, HSPA ACK/NACK 425-1 is mapped into pre-defined LTE subframes (e.g., even subframes 840-1 and 840-3 as shown by space 440 for ACK/NACK codebook 615 in FIG. 8) as HSPA A/N 615, and is multiplexed with LTE ACK/NACK 620. Additionally, two separate functionalities for multi-ACK/NACK are defined for odd LTE subframes (e.g., 840-2 and 840-4):

3a) No HSPA A/N 615 is transmitted in the cases there is no LTE ACK/NACK signaling taking place during odd LTE subframes. That is, the number of bits for the HSPA A/N 615 is zero for these odd LTE subframes. This is shown in FIG. 8, because no LTE A/N 620 occurs in LTE subframe 840-2 and therefore no HSPA A/N 615 is placed in the subframe 840-2. This option implies that an HSPA ACK/NACK 615 shall not be transmitted in the odd subframe 840-2 even if the HSPA ACK/NACK repetition would have been configured if there are no LTE ACK/NACKs 620 to be transmitted simultaneously in that odd subframe 840-2. This helps in mitigating potential error cases, and keeps LTE ACK/NACK operation similar as to the LTE ACK/NACK operation in Release-10.

3b) HSPA A/N 615 is multiplexed with LTE A/N 620 in the cases there is at least one LTE ACK/NACK signaling taking place during odd LTE subframes (e.g., 840-2, 840-4). In these cases HSPA ACK/NACK(s) 615 is mapped into pre-defined signaling states (e.g., NACK 851) and multiplexed with LTE ACK/NACK 620. This provides a constant ACK/NACK codebook size 605 between LTE subframes 840-3 and 840-4. Alternatively, an HSPA ACK/NACK 615 can also be mapped onto both LTE subframes 840 similarly as in Option 2 (e.g., to support HSPA ACK/NACK repetition). The ACK/NACK 850 in LTE subframe 840-4 indicates that both HSPA ACK/NACK 615 and LTE ACK/NACK 620 are communicated in that LTE subframe 840.

Thus, FIG. 8 shows an example of a third configured signaling strategy for multiplexing HSPA A/N and LTE A/N. Option 3b defines that (without A/N repetition configure) a predetermined signaling state (e.g. NACK) shall be transmitted. This option is clearly different from Option 1 since this arrangement would keep the ACK/NACK codebook size constant in all the LTE subframes 840 (e.g., 840-3 and 840-4).

Further, Option 3 is different from Option 1 & 2 since Option 3 defines the HSPA ACK/NACK behavior in the case there are/are not LTE A/Ns transmitted in the odd subframes. This was not part of the description with respect to Options 1 & 2. Option 3a (e.g., see "LTE (a)" in FIG. 8 and "3a" above) defines the system operation in case there is no A/N in the odd subframe. Option 3b (e.g., see "LTE (b)" in FIG. 8 and "3b" above) defines the same when there is an LTE A/N present in the odd subframe.

A difference between Option 1 and Option 3 is that Option 3 defines specific functionality for how to handle situations when there are/are not LTE ACK/NACKs transmitted during the odd LTE subframe (e.g., LTE subframe 840-2 does not contain an LTE ACK/NACK, whereas LTE subframe 840-4 does contain an LTE ACK/NACK). Option 1 is a more generic rule and does not take this into account.

Signaling the predetermined configured signaling strategy (e.g., Options 2 and 3) instead of changing the codebook size 605 (Option 1) can be seen as more implementation friendly approach (compared to Option 1) for both the UE and eNB.

A common feature of Option 2 and Option 3b is that codebook size 605 of ACK/NACK codebook 610 (containing HSPA A/N 615 and LTE A/N 620) is constant in every LTE subframe 430/840 (assuming NACK 851 is used).

The main difference between Option 2 and Option 3 is that there is a difference in effective transmission time interval (or duration of the transmission) with HSPA A/N (Option 2: 2 ms, Option 3: 1 ms).

It can be noted that if UL coverage is not a bottleneck then it is better to have 1 (one) ms TTI for HSPA A/N. This will simplify other multiplexing options (A/N+CQI, A/N+PUSCH data). On the other hand, if the coverage is limited, then Option 2 is the preferred choice.

Regarding possible implementation for these (and other) Options, the multiplexing between HSPA-LTE ACK/NACK and other LTE UL signals changes from subframe to subframe based on:

1) Configured signaling strategy (e.g., described in Option 1-Option 3 above), and a) Size of ACK/NACK codebook 610; and b) Usage of ACK/NACK repetition (see, e.g., Option 2 in FIG. 7).

2) UL (PUSCH) scheduling: When a container of ACK/NACK can be scheduled on PUSCH or PUCCH.

In all cases, in an exemplary embodiment, HSPA-LTE ACK/NACK is jointly coded in pre-determined way. The joint coding may be made using known coding schemes such as Reed-Muller or Convolutional coding. In joint coding, the same channel coding may be applied over all the bits, e.g., both HSPA and LTE A/N bits. There are two ways to convey HSPA-LTE ACK/NACK on PUCCH, namely PUCCH channel selection and PUCCH Format 3. Furthermore, it is possible to transmit jointly coded ACK/NACK on pre-determined PUSCH multiplexed with UL data.

As proposed above, no cross carrier scheduling will be allowed with an HSPA carrier. Hence, PUCCH Format 1b resources corresponding to HSPA carrier (subject to PUCCH channel selection) are reserved explicitly via RRC. The same applies for PUCCH Format 3 based on block-spread DFT-S-OFDMA (DFT-spread OFDMA, where DFT is a discrete Fourier transform).

One of the issues related to resource allocation is that the allocation has been agreed upon to support relativistic PUCCH multi-ACK/NACK resource indicator (ARI) included in a DL grant (corresponding to SCell). The problem with this current use case is that such dynamic signaling may not available in the case of HSPA+LTE CA. Two methods are proposed for this problem:

1) ARI is signaled explicitly via higher layers; and
2) Usage of ARI is switched off in the case of HSPA+LTE CA (ARI=0).

It is also possible that ARI is included in PDCCH corresponding to LTE. In this case, when UE receives at least one resource allocation grant containing ARI, it can select the ACK/NACK resource based on received ART.

Figure 9:
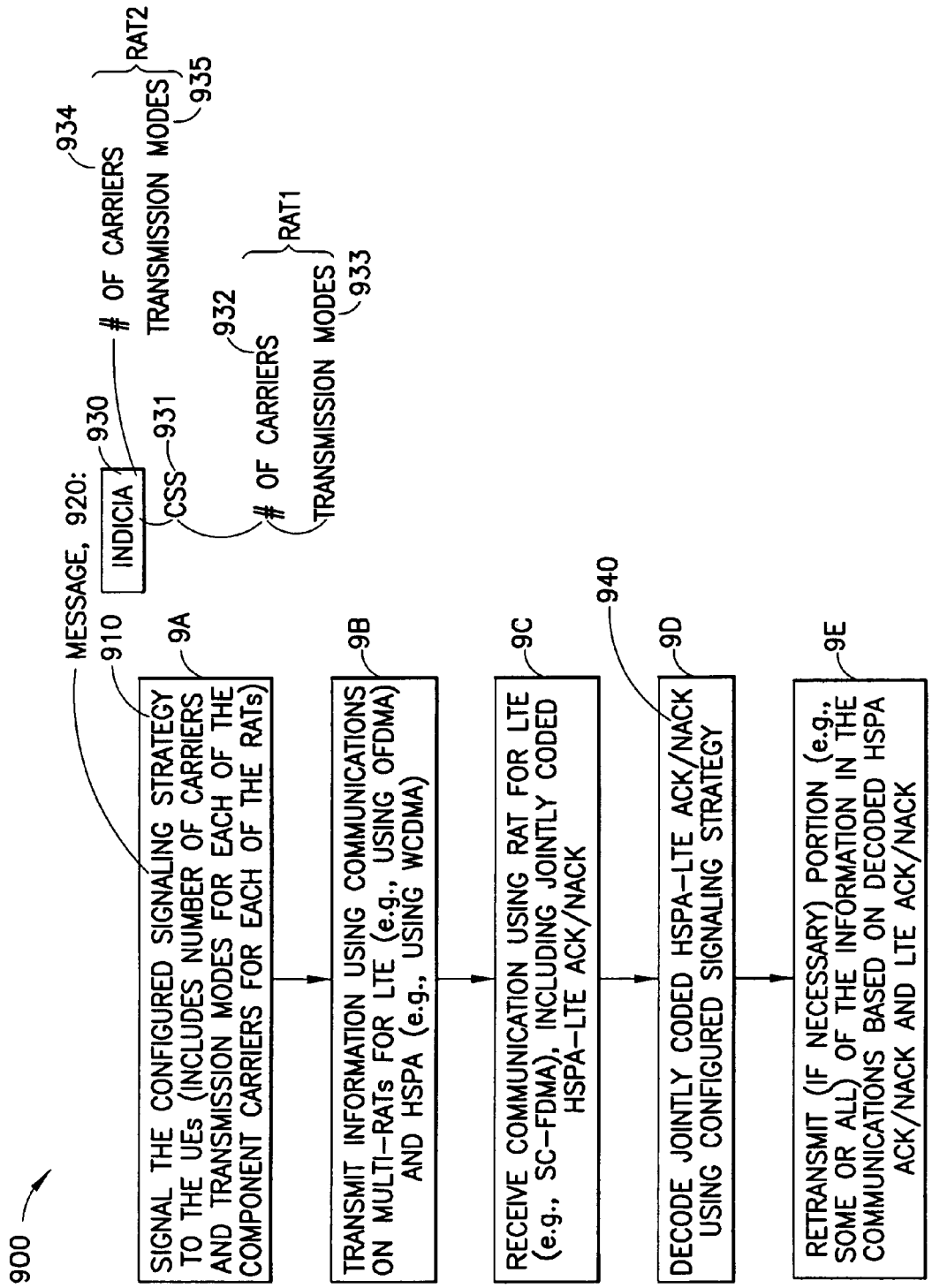
FIG. 9 is a block diagram of a exemplary flowchart performed by one or more base stations for uplink ACK/NACK for inter-radio access technology carrier aggregation.

Turning to FIG. 9, a block diagram is shown of a flowchart 900 performed by one or more base stations (e.g., 12, 50) for uplink ACK/NACK for inter-radio access technology carrier aggregation. The flowchart 900 may be partially or completely performed by the programs 12C, 50C (see FIG. 3), executed by corresponding data processors 12A, 50A. The flowchart 900 may also be performed partially or completely by hardware (e.g., an integrated circuit configured to perform the blocks). Additionally, some combination of software/execution on a data processor or hardware may be used. It is noted that the eNB 12 and the Node B 50 in the example of FIG. 3 are co-located. However, they could additionally be combined into a single base station that performs the functions of the eNB 12 and the Node B 50.

In the exemplary description below and for ease of reference, a single base station will be described as performing the blocks, but blocks could be performed by multiple base stations. For example, the eNB 12 might perform (with communication with Node B 50), block 9A, but each of the base stations 12, 50 would individually transmit information using their corresponding radio access technologies in block 9B.

In block 9A, the base station signals the configured signaling strategy 910 to the UEs. In an example, this is included in a message 920 that includes indicia 930. The indicia 930 include an indication 931 of the configured signaling strategy 910, indications 932, 934 of the number of carriers and indications 933, 935 of transmission modes for each of the component carriers for each of the radio access technologies (RAT 1, RAT 2). Option 1, described above, may not use explicit signaling as in block 9A. Instead, both the UE and the base station will follow predetermined rules, e.g. as shown in FIG. 6. In block 9B, the base station transmits information using communications on multi-RATs for LTE (e.g., using OFDMA) and HSPA (e.g., using WCDMA).

In block 9C, the base station receives a communication using the RAT for LTE (e.g., SC-FDMA), including the jointly coded HSPA-LTE ACK/NACK 940 (e.g., jointly coded ACK/NACK codebook 610). It is note that joint coding is only an example, as described below in reference to blocks 10D and 10E of FIG. 10. In block 9D, the base station decodes the jointly coded HSPA-LTE ACK/NACK 940 using the configured signaling strategy 910. In block 9E, the base station retransmits (if necessary) portion (e.g., some or all) of the information in the communications based on the decoded HSPA ACK/NACK (e.g., a decoded version of HSPA A/N 615) and LTE ACK/NACK (e.g., a decoded version of LTE A/N 620). It is noted that the retransmission will involve one or more of the RATs (RAT 1, RAT 2).

FIG. 10 is a block diagram of a flowchart performed by a user equipment for uplink ACK/NACK for inter-radio access technology carrier aggregation. The flowchart 1000 may be partially or completely performed by the program 10C (see FIG. 3), executed by corresponding data processors(s) 10A. The flowchart 900 may also be performed partially or completely by hardware (e.g., an integrated circuit configured to perform the blocks). Additionally, some combination of software/execution on a data processor or hardware may be used.

In block 10A, the user equipment receives signaling of the configured signaling strategy 910 from the base station. In the exemplary embodiment from FIG. 9A, the signaling uses a message 920 that includes indicia 930. The indicia 930 include an indication 931 of the configured signaling strategy 910, indications 932, 934 of the number of carriers and indications 933, 935 of transmission modes for each of the component carriers for each of the radio access technologies (RAT 1, RAT 2). It is noted that not all embodiments use the signaling of block 10A. As noted above, for instance, Option 1 may not use explicit signaling as in block 10A. Instead, both the UE and the base station will follow predetermined rules, e.g. as shown in FIG. 6. In block 10B, the user equipment receives information using communications effected by multi-RATs for LTE (e.g., using OFDMA) and HSPA (e.g., using WCDMA).

In block 10C, the user equipment determines a number of bits used for first feedback information corresponding to the received communication for LTE and a number of bits used for second feedback information corresponding to the received communication for HSPA. Block 10C may entail accessing the configured signaling strategy 910 when performing this block. As shown in FIGS. 6 and 8, for any single RAT, the number of bits for feedback information in any particular LTE subframe may be zero or non-zero. In block 10D, the user equipment includes in each subframe the first feedback information using the determined number of bits and the second feedback information using the determined number of bits. In one exemplary embodiment, this block is performed by, for each subframe, jointly coding the HSPA-LTE ACK/NACK 940 (e.g., ACK/NACK codebook 610) using the configured signaling strategy 910 (block 10E). However, this is only one possibility and other techniques are possible. For instance, each the HSPA A/N 615 and LTE A/N 620 may be separately coded.

In Block 10F, the user equipment transmits the subframes using the RAT for LTE (e.g., using SC-FDMA). Exemplary subframes are described above in reference to FIGS. 4 and 6-8. In block 10G, the user equipment receives any retransmissions of information on one or more of the multi-RATs for LTE (e.g., using OFDMA) and HSPA (e.g., using WCDMA).

Exemplary embodiments of the invention provide, but are not limited to, one or more of the following advantages:

1) The invented principle allows for smooth and seamless operation of carrier aggregation involving both LTE and HSPA DL carriers.

2) The standardization effort can be minimized as the existing LTE advanced UL signaling structures can be reutilized to a large extent.

3) The ACK/NACK repetition solution guarantees HSPA coverage without burdening base stations such as the eNodeB with any scheduling restrictions.

Without in any way limiting the scope, interpretation, or application of the claims appearing below, a technical effect of one or more of the example embodiments disclosed herein is to provide multiple configured signaling strategies used for HSPA and LTE ACK/NACK.

Embodiments of the present invention may be implemented in software, hardware, application logic or a combination of software, hardware and application logic. In an exemplary embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with examples of computers described and depicted, e.g., in FIG. 3. A computer-readable medium may comprise a computer-readable storage medium that may be any media or means that can contain or store the instructions for use by or in connection with an instruction execution system, apparatus, or device, such as a computer.

It is also noted that any of the embodiments herein (including in the claims) may be implemented in an apparatus/device that includes means for performing certain functions. For instance, an apparatus could include means, for each of a plurality of subframes to be communicated using a first radio access technology, for determining a first number of bits used for first feedback information corresponding to a first communication effected using the first radio access technology and a second number of bits used for second feedback information corresponding to a second communication effected using a second radio access technology. The apparatus also could include means, using only the first radio access technology, for communicating the plurality of subframes, wherein for each of the plurality of subframes, included in the subframe are the first feedback information using the determined first number of bits and the second feedback information using the determined second number of bits.

In another exemplary embodiment, a computer program product includes a computer-readable medium bearing computer program code embodied therein for use with a computer, the computer program code comprising: code for, for each of a plurality of subframes to be communicated using a first radio access technology, determining a first number of bits used for first feedback information corresponding to a first communication effected using the first radio access technology and a second number of bits used for second feedback information corresponding to a second communication effected using a second radio access technology; and code for, using only the first radio access technology, communicating the plurality of subframes, wherein for each of the plurality of subframes, included in the subframe are the first feedback information using the determined first number of bits and the second feedback information using the determined second number of bits.

As another example, a computer program is disclosed that includes: code for, for each of a plurality of subframes to be communicated using a first radio access technology, determining a first number of bits used for first feedback information corresponding to a first communication effected using the first radio access technology and a second number of bits used for second feedback information corresponding to a second communication effected using a second radio access technology; and code for, using only the first radio access technology, communicating the plurality of subframes, wherein for each of the plurality of subframes, included in the subframe are the first feedback information using the determined first number of bits and the second feedback information using the determined second number of bits, when the computer program is run on a processor. The computer program according to this paragraph, wherein the computer program is a computer program product comprising a computer-readable medium bearing computer program code embodied therein for use with a computer.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims

What is claimed is:

1. A method comprising:
    for each of a plurality of subframes to be communicated using a first radio access technology, determining a first number of bits used for first feedback information corresponding to a first communication effected using the first radio access technology and a second number of bits used for second feedback information corresponding to a second communication effected using a second radio access technology; and
    using only the first radio access technology, communicating the plurality of subframes, wherein for each of the plurality of subframes, included in the subframe are the first feedback information using the determined first number of bits and the second feedback information using the determined second number of bits,
    wherein determining further comprises;
    determining whether the first number of bits used for the first feedback information is non-zero or is non-zero for a second pair of subframes;
    in response to determining the first number of bits used for the first feedback information is non-zero for the second of the pair of subframes, determining the second number of bits used for the second feedback information in the second of the pair of subframes is non-zero; and
    in response to determining the first number of bits used for the first feedback information is zero for the second of the pair of subframes, determining the second number of bits used for the second feedback information in the second of the pair of subframes is zero.

2. The method of claim 1, wherein the first communication is received by using the first radio access technology, the second communication is received by using the second radio access technology, and communicating the plurality of subframes comprises transmitting the plurality of subframes.

3. The method of claim 2, wherein the transmitting uses a physical uplink control channel.

4. The method of claim 1, wherein determining further comprises determining the second number of bits used for the second feedback information is not zero for a first of a pair of subframes and is zero for the second of the pair of subframes, and wherein determining further comprises determining the first number of bits used for the first feedback information is a fixed, non-zero number for both the first and second of the pair of subframes, and wherein the method further comprises including, for the second of the pair of subframes, only the first feedback information using the determined first number of bits.

5. The method of claim 1, wherein determining further comprises determining the second number of bits used for the second feedback information is a same number for a first of a pair of subframes and for a second of the pair of subframes, wherein determining further comprises determining the first number of bits used for the first feedback information is a fixed, non-zero number for both the first and second of the pair of subframes, and wherein the method further comprises including the second feedback information in the first of the pair of subframes and repeating the second feedback information in the second of the pair of subframes.

6. The method of claim 1, further comprising, for each of the plurality of subframes, jointly coding the corresponding first and second feedback information and including in the subframe the jointly coded corresponding first and second feedback information.

7. The method of claim 1, wherein determining further comprises using a received configured signaling strategy to determine the first number of bits used for first feedback information and to determine the second number of bits used for the second feedback information.

8. The method of claim 1, wherein determining further comprises:
   determining the first number of bits of the first feedback information based at least on a number of component carriers and transmission modes for each of the component carriers for the first communication effected using the first radio access technology; and
   determining the second number of bits of the second feedback information based on a number of component carriers and transmission modes for each of the component carriers for the second communication effected using the second radio access technology.

9. The method of claim 1, wherein the first radio access technology uses orthogonal frequency division multiple access for the first communication, the second radio access technology uses wideband code division multiple access for the second communication, and communicating the plurality of subframes further comprises using single carrier, frequency division multiple access of the first radio access technology to communicate the plurality of subframes.

10. The method of claim 1, wherein the at least one component carrier of the first radio access technology is considered as a primary cell and at least one component carrier of the second radio access technology is considered as a secondary cell.

11. The method of claim 1, where the first feedback information corresponds to acknowledgement/negative-acknowledgement corresponding to the first radio access technology and the second feedback information corresponds to acknowledgement/negative-acknowledgement corresponding to the second radio access technology.

12. The method of claim 1, where the first radio access technology is a long term evolution radio access technology.

13. The method of claim 1, wherein coupling between acknowledgement/negative-acknowledgement and channel quality indicator of the second radio access technology is removed when signaling acknowledgement/negative-acknowledgement and channel quality indicator feedback using only the first radio access technology.

14. An apparatus comprising:
   at least one transceiver configured to transmit and receive using a first radio access technology and configured to receive using a second radio access technology;
   at least one processor; and
   at least one memory including computer program code,
   the at least one memory and the computer program code configured, with the at least one processor, cause the apparatus to perform at least the following:
   for each of a plurality of subframes to be communicated using a first radio access technology, determining a first number of bits used for first feedback information corresponding to a first communication effected using the first radio access technology and a second number of bits used for second feedback information corresponding to a second communication effected using the second radio access technology; and
   using only the first radio access technology, communicating the plurality of subframes, wherein for each of the plurality of subframes, included in the subframe are the first feedback information using the determined first number of bits and the second feedback information using the determined second number of bits,
   wherein determining further comprises:
   determining whether the first number of bits used for the first feedback information is non-zero or is zero for a second of a pair of subframes;
   in response to determining the first number of bits used for the first feedback information is non-zero for the second of the pair of subframes, determining the second number of bits used for the second feedback information in the second of the pair of subframes is non-zero; and
   in response to determining the first number of bits used for the first feedback information is zero for the second of the pair of subframes, determining the second number of bits used for the second feedback information in the second of the pair of subframes is zero.

15. The apparatus of claim 14, wherein determining further comprises determining the second number of bits used for the second feedback information is not zero for a first of a pair of subframes and is zero for the second of the pair of subframes, and wherein determining further comprises determining the first number of bits used for the first feedback information is a fixed, non-zero number for both the first and second of the pair of subframes, and wherein the at least one memory and the computer program code are further configured to, with the at least one processor, cause the apparatus to perform at least including, for the second of the pair of subframes, only the first feedback information using the determined first number of bits.

16. A method comprising:
   transmitting a first communication effected using a first radio access technology and a second communication effected using a second radio access technology; and
   using only the first radio access technology, receiving a plurality of subframes, wherein for each of the plurality of subframes, included in the subframe are a first feedback information using a first number of bits and a second feedback information using a second number of bits, where the first feedback information corresponds to the first communication and the second feedback information corresponds to the second communication, and further comprising:

determining whether the first number of bits used for the first feedback information is non-zero or is zero for a second of a pair of subframes;

in response to determining the first number of bits used for the first feedback information is non-zero for the second of the pair of subframes, determining the second number of bits used for the second feedback information in the second of the pair of subframes is non-zero; and in response to determining the first number of bits used for the first feedback information is zero for the second of the pair of subframes, determining the second number of bits used for the second feedback information in the second of the pair of subframes is zero.

17. The method of claim 16, further comprising, for each of the plurality of subframes, decoding jointly coded corresponding first and second feedback information to determine the first feedback information and the second feedback information per subframe, retransmitting a portion of the first communication using the first radio access technology if required by the first feedback information, and retransmitting a portion of the second communication using the second radio access technology if required by the second feedback information.

18. An apparatus comprising:

at least one transceiver configured to transmit and receive using a first radio access technology and configured to transmit using a second radio access technology;

at least one processor; and at least one memory including computer program code, the at least one memory and the computer program code configured, with the at least one processor, to cause the apparatus to perform at least the following:

transmitting a first communication effected using a first radio access technology and a second communication effected using a second radio access technology; and using only the first radio access technology, receiving a plurality of subframes, wherein for each of the plurality of subframes, included in the subframe are a first feedback information using a first number of bits and a second feedback information using a second number of bits, where the first feedback information corresponds to the first communication and the second feedback information corresponds to the second communication, wherein the at least one memory and the computer program code are further configured, with the at least one processor, to cause the apparatus to perform:

determining whether the first number of bits used for the first feedback information is non-zero or is zero for a second of a pair of subframes;

in response to determining the first number of bits used for the first feedback information is non-zero for the second of the pair of subframes, determining the second number of bits used for the second feedback information in the second of the pair of subframes is non-zero; and in response to determining the first number of bits used for the first feedback information is zero for the second of the pair of subframes, determining the second number of bits used for the second feedback information in the second of the pair of subframes is zero.

19. The apparatus of claim 18, wherein the at least one memory and the computer program code configured to, with the at least one processor, cause the apparatus to perform for each of the plurality of subframes, decoding jointly coded corresponding first and second feedback information to determine the first feedback information and the second feedback information per subframe, retransmitting a portion of the first communication using the first radio access technology if required by the first feedback information, and retransmitting a portion of the second communication using the second radio access technology if required by the second feedback information.

* * * * *

UNITED STATES PATENT AND TRADEMARK OFFICE
CERTIFICATE OF CORRECTION

PATENT NO. : 8,837,358 B2  
APPLICATION NO. : 12/906520  
DATED : September 16, 2014  
INVENTOR(S) : Lunttila et al.

It is certified that error appears in the above-identified patent and that said Letters Patent is hereby corrected as shown below:

In the Claims

Claim 1, col. 14, line 51 "non-zero" should be deleted and --zero-- should be inserted. (second occurrence)

Claim 14, col. 16, line 14 --to,-- should be inserted in between "configured" and "with".

Signed and Sealed this  
Eighteenth Day of November, 2014

Michelle K. Lee  
*Deputy Director of the United States Patent and Trademark Office*